(12) United States Patent
Yamasoto

(10) Patent No.: US 12,739,530 B2
(45) Date of Patent: Sep. 15, 2026

(54) IMAGING ELEMENT AND ELECTRONIC DEVICE

(71) Applicant: SONY SEMICONDUCTOR SOLUTIONS CORPORATION, Kanagawa (JP)

(72) Inventor: Keita Yamasoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 114 days.

(21) Appl. No.: 18/726,427

(22) PCT Filed: Dec. 23, 2022

(86) PCT No.: PCT/JP2022/047546
§ 371 (c)(1),
(2) Date: Jul. 3, 2024

(87) PCT Pub. No.: WO2023/136093
PCT Pub. Date: Jul. 20, 2023

(65) Prior Publication Data

US 2025/0080869 A1 Mar. 6, 2025

(30) Foreign Application Priority Data

Jan. 31, 2022 (JP) ................................ 2022-003841

(51) Int. Cl.
*H04N 25/633* (2023.01)
*H04N 25/78* (2023.01)

(52) U.S. Cl.
CPC .......... *H04N 25/633* (2023.01); *H04N 25/78* (2023.01)

(58) Field of Classification Search
CPC ...... H04N 25/633; H04N 25/78; H04N 25/76; H04N 25/77; H04N 25/63
See application file for complete search history.

(56) References Cited

U.S. PATENT DOCUMENTS

2009/0201393 A1* 8/2009 Tai ..................... H10F 39/8053 348/340
2019/0045149 A1* 2/2019 Guidash ................ H04N 25/57
2022/0247950 A1* 8/2022 Takahashi ........... H04N 25/633

FOREIGN PATENT DOCUMENTS

JP 2016-119592 A 6/2016
WO 2013/145753 A1 10/2013
WO 2019/111624 A1 6/2019
WO 2020/202409 A1 10/2020

OTHER PUBLICATIONS

International Search Report and Written Opinion of PCT Application No. PCT/JP2022/047546, issued on Mar. 20, 2023, 09 pages of ISRWO.

* cited by examiner

*Primary Examiner* — Nhan T Tran
(74) *Attorney, Agent, or Firm* — CHIP LAW GROUP

(57) ABSTRACT

Provided are an imaging element and an electronic device capable of suppressing fluctuation of a black level. The imaging element includes a pixel array unit in which a plurality of pixels including a photoelectric conversion element is arranged in a matrix, the pixel array unit including a plurality of first pixels that perform normal imaging, a second pixel capable of acquiring black-level information, a first control line that controls charge transfer of the plurality of first pixels, and a second control line that is different from the first control line and controls charge transfer of the second pixel.

18 Claims, 16 Drawing Sheets

12 : ROW SCANNING CIRCUIT
122
Lo FIXED
NEGATIVE VOLTAGE
124
126
128
Hi/Lo (NEGATIVE LEVEL)
120
11A:FIRST PIXEL
11B : SECOND PIXEL
101a-Rst
101a-Trg
101a-Sel
101b-Trg
101b-Rst
101b-Sel
VDD
lsgn
RST
AMP
SEL
FD
TRG
PD

FIG. 4

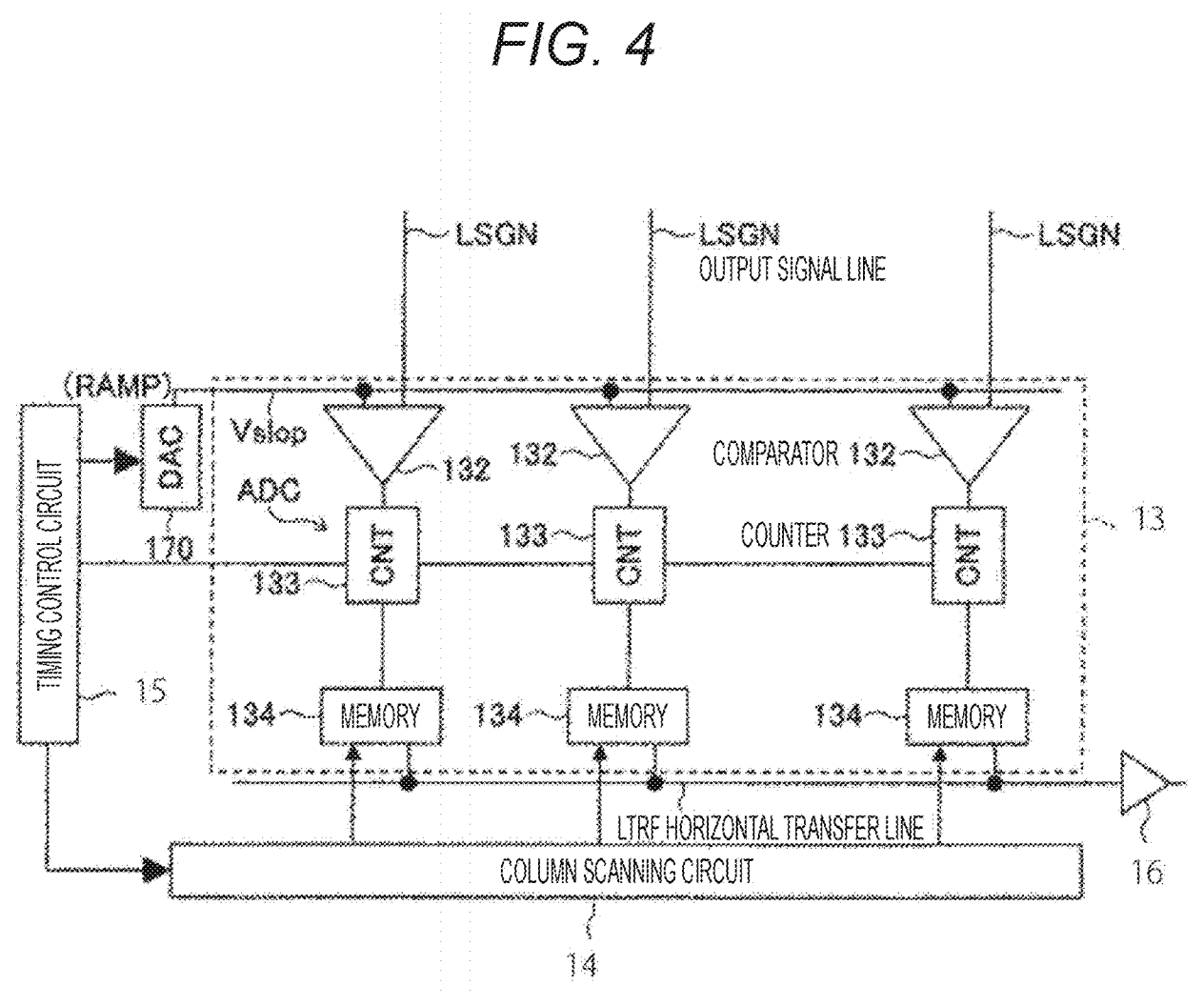

LSGN
LSGN
OUTPUT SIGNAL LINE
LSGN
13
16
COMPARATOR 132
132
132
COUNTER 133
133
133
CNT
CNT
CNT
MEMORY
MEMORY
MEMORY
134
134
134
LTRF HORIZONTAL TRANSFER LINE
COLUMN SCANNING CIRCUIT
14
Vslop
ADC
(RAMP)
DAC
170
15
TIMING CONTROL CIRCUIT SECOND PIXEL COLUMN
A12 : NORMAL BLACK PORTION
L 2
S a : average
S L 2 profile
S c : AFTER CORRECTION
P 2
11
DEVIATION AMOUNT FROM NORMAL BLACK OUTPUT NORMAL PIXEL COLUMN
CORRECTION PIXEL COLUMN
NORMAL PIXEL COLUMN
NORMAL PIXEL COLUMN
NORMAL PIXEL COLUMN
CORRECTION PIXEL COLUMN
NORMAL PIXEL COLUMN
NORMAL PIXEL COLUMN
NORMAL PIXEL COLUMN
CORRECTION PIXEL COLUMN
CORRECTION PIXEL ROW
NORMAL ROW
NORMAL ROW
NORMAL ROW
10
101a-0
101b-0
101a-1
101b-1
101a-2
101b-2
101a-3
101b-3

FIG. 13

11
LSGN1
LSGN2
LSGN3
LSGN4
101a-0
101b-0
101a-2
101b-2
101a-1
101b-1
101a-3
101b-3
1AD
2AD
3AD
4AD
13-1a
13-1b
M131

IMAGING ELEMENT AND ELECTRONIC DEVICE

CROSS REFERENCE TO RELATED APPLICATIONS

This application is a U.S. National Phase of International Patent Application No. PCT/JP2022/047546 filed on Dec. 23, 2022, which claims priority benefit of Japanese Patent Application No. JP 2022-003841 filed in the Japan Patent Office on Jan. 13, 2022. Each of the above-referenced applications is hereby incorporated herein by reference in its entirety.

TECHNICAL FIELD

The present disclosure relates to an imaging element and an electronic device.

BACKGROUND ART

In general, in an imaging element including a complementary metal oxide semiconductor (CMOS), an AD converter is arranged for each column of pixels, and analog-digital conversion is performed for each row. However, there is a possibility that a black level of a row with no imaging light and a black level of a row in which the imaging light is received in a partial area fluctuate.

CITATION LIST

Patent Document

Patent Document 1: Japanese Patent Application Laid-Open No. 2016-119592

SUMMARY OF THE INVENTION

Problems to be Solved by the Invention

Therefore, the present disclosure provides an imaging element and an electronic device capable of suppressing variation in black level.

Solutions to Problems

In order to solve the above problem, according to the present disclosure, there is provided an imaging element including a pixel array unit in which a plurality of pixels including a photoelectric conversion element is arranged in a matrix, the pixel array unit including:

a plurality of first pixels that perform normal imaging;

a second pixel capable of acquiring black-level information;

a first control line that controls charge transfer of the plurality of first pixels;

and a second control line that is different from the first control line and controls charge transfer of the second pixel.

The plurality of first pixels and the plurality of second pixels may be arranged in a same row, the plurality of first pixels may be connected to the first control line arranged corresponding to the same row, and the plurality of second pixels may be connected to the second control line arranged corresponding to the same row.

The second pixel may be changeable between a first mode in which normal imaging is performed and a second mode in which black level information is acquired according to control of the second control line.

The second pixel may further include a floating diffusion configured to output electric charge photoelectrically converted by the photoelectric conversion element, and a transfer transistor connected to the photoelectric conversion element and the floating diffusion, and the second control line may be connected to a gate of the transfer transistor.

In the second mode, the second control line may supply a low-level signal in a predetermined period during an imaging operation.

In the first mode, the second control line may supply a high-level signal during a period corresponding to the predetermined period.

The second control line may be connected to the first control line connected to the first pixel arranged in the same row through a first switching element.

The second control line may be connected to a power supply that supplies a low-level signal through a second switching element.

In the first mode, the first switching element may be brought into a conductive state and the second switching element may be brought into a non-conductive state.

In the second mode, the first switching element may be brought into a non-conductive state and the second switching element may be brought into a conductive state.

A plurality of the second pixels may be arranged in a plurality of predetermined columns of the pixel array unit.

The second pixels may be arranged in a plurality of predetermined rows of the pixel array unit.

A plurality of the second pixels may be arranged in a predetermined row at an end portion of the pixel array unit.

An arrangement position of the plurality of first pixels on a predetermined row may be different from an arrangement position on a row of the plurality of second pixels in a row different from the predetermined row.

There may be further included a row scanning circuit that drives the pixel array unit in units of rows to read pixel signals from the pixels; and a plurality of analog-to-digital conversion units that performs analog-to-digital conversion of the pixel signals for each column of the pixel array unit.

There may be further included a pixel drive unit that drives the pixel array unit in units of rows to read pixel signals from the pixels; and a plurality of analog-to-digital conversion units that perform analog-to-digital conversion of the pixel signals of the pixels arranged in a column shape of the pixel array unit for each row.

The second pixel may be arranged corresponding to a predetermined analog-to-digital conversion unit among the plurality of analog-to-digital conversion units.

The display device may further include a signal processing circuit that corrects an output value of each pixel of the pixel array unit on the basis of black level information acquired by the second pixel.

In order to solve the above problem, according to the present disclosure, an electronic device including the imaging element and an optical system that supplies imaging light to the imaging element is provided.

BRIEF DESCRIPTION OF DRAWINGS

FIG. 4 is a diagram illustrating a configuration example of a column ADC unit.

FIG. 13 is a diagram illustrating an arrangement example of another second pixel in the pixel array unit illustrated in FIG. 11.

MODE FOR CARRYING OUT THE INVENTION

Hereinafter, embodiments of an imaging element and an electronic device will be described with reference to the drawings. Although principal components of the imaging element and the electronic device will be mainly described below, the imaging element and the electronic device may include components and functions that are not illustrated or described. The following description does not exclude components and functions that are not depicted or described.

First Embodiment

Figure 1:
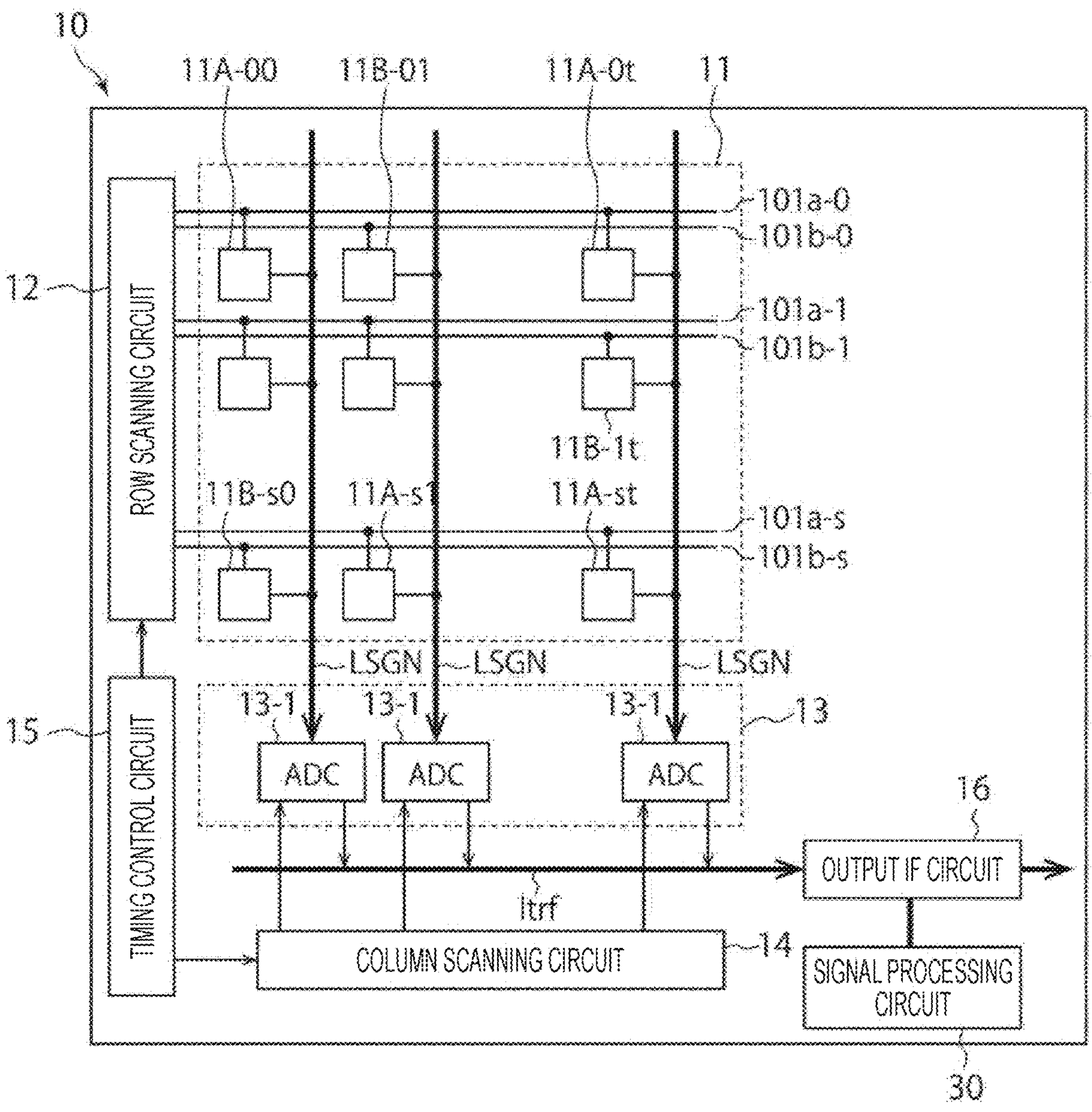
FIG. 1 is a diagram illustrating a configuration example of an imaging element according to the present embodiment.

FIG. 1 is a diagram illustrating a configuration example of an imaging element 10 according to the present embodiment. As illustrated in FIG. 1, the imaging element 10 is, for example, a CMOS image sensor. The imaging element 10 is an imaging element capable of acquiring information of a black level by pixels in an imaging area. The imaging element 10 includes a pixel array unit 11, a row scanning circuit 12, a column processing unit (reading circuit) 13, a column scanning circuit 14, a timing control circuit 15, an output interface (IF) circuit 16, and a signal processing circuit 30.

In the pixel array unit 11, a plurality of pixels 11-00 to 11-*st* are arranged two-dimensionally (in a matrix). A first pixel among the plurality of pixels 11-00 to 11-*st* is denoted by A, and a second pixel is denoted by B. That is, in the pixel array unit 11, the first pixels 11A and the second pixels 11B are arranged in a mixed manner.

The first pixels 11A are normal pixels capable of performing general imaging. The second pixels 11B are pixel that can also acquire black level information. For example, the second pixels 11B according to the present embodiment can switch between normal imaging and imaging for acquiring black level information. The second pixels 11B are arranged in pixels arranged two-dimensionally according to a predetermined rule. Therefore, the total number of pixels is (s+1)×(t+1). Note that a detailed configuration of the first pixels 11A and the second pixels 11B will be described later.

Further, a row scanning control line 101*a* in am s row for the first pixels 11A and a row scanning control line 101*b* in the s row for the second pixels 11B are provided. That is, the first pixels 11A are connected to row scanning control lines 101*a*-0 to 101*a*-*s*, and the second pixels 11B are connected to row scanning control lines 101*b*-0 to 101*b*-*s*.

The row scanning circuit 12 drives the pixels through the row scanning control lines 101*a*-0 to 101*a*-*s* and 101*b*-0 to 101*b*-*s* in a shutter row and a reading row according to the control of a shutter control unit and a reading control unit of the timing control circuit 15. As a result, different control can be performed on the first pixel 11A and the second pixel 11B. Note that the row scanning control lines 101*b*-0 to 101*b*-*s* according to the present embodiment are arranged in all rows, but the present invention is not limited thereto. For example, the row scanning control line 101*b* may not be arranged in a pixel in which the second pixel 11B is not arranged.

The column processing unit 13 reads a signal vsl output to an output signal line LSGN, outputs a read signal to a transfer line ltrf according to the column scanning of the column scanning circuit 14, and outputs the read signal to the outside by the output IF circuit 16. In the example of FIG. 1, the column processing unit 13 is configured as a column ADC unit in which an analog-digital conversion unit (AD converter (ADC)) 13-1 is arranged for each column. The column ADC unit performs AD conversion in units of columns, outputs a read signal of the AD-converted data to the transfer line ltrf according to scanning of the column scanning circuit 14, and outputs the read signal to the outside by the output IF circuit 16.

The signal processing circuit 30 is a circuit capable of performing black level correction processing on the image data captured by the pixel array unit 11. The output IF circuit 16 may output data processed by the signal processing circuit 30, or may output image data without passing through the signal processing circuit 30. For example, the output IF circuit 16 outputs the image data without passing through the signal processing circuit 30 in a first mode (normal imaging mode) to be described later. On the other hand, the output IF circuit 16 outputs the processed image data through the signal processing circuit 30 in a second mode (black level correction mode) to be described later.

Figure 2:
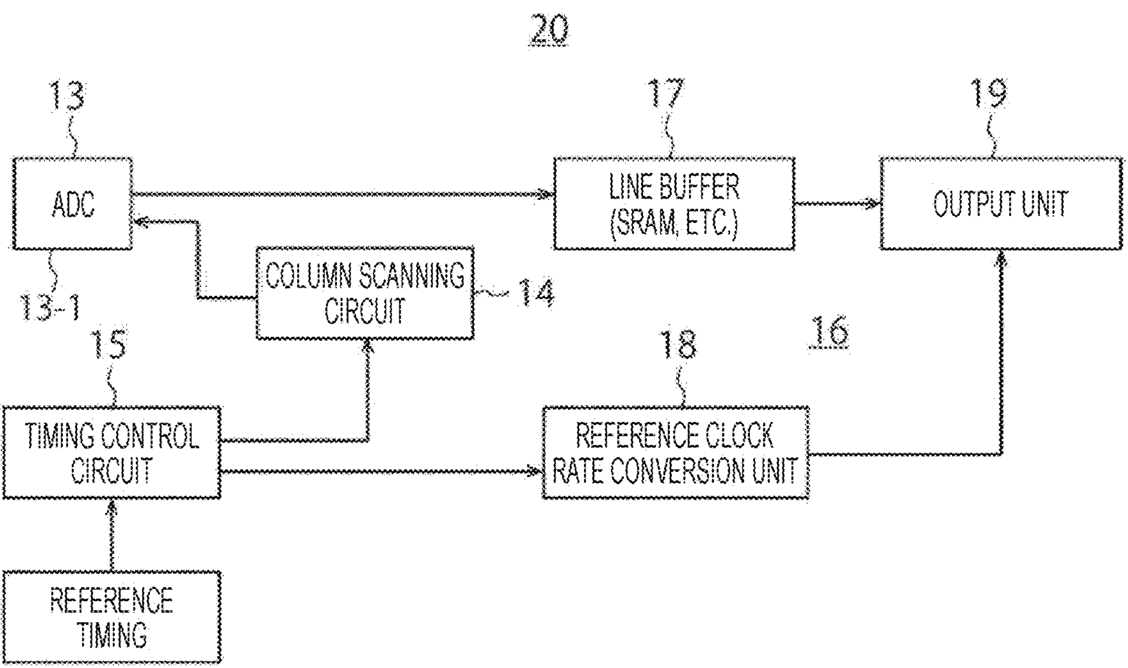
FIG. 2 is a block diagram illustrating a configuration example of a data conversion control unit including an output system of captured image data.

FIG. 2 is a block diagram illustrating a configuration example of a data conversion control unit including an output system of image data after the column processing unit of the imaging element 10 in FIG. 1. In the data conversion control unit 20 of FIG. 2, the output IF circuit 16 includes a line buffer 17, a reference clock rate conversion unit 18, and a data output unit 19. As described above, in the imaging element 10 of FIG. 2, the rate conversion is performed by using the line buffer 17 for the data after the AD conversion processing of the column processing unit 13. Note that the line buffer 17 is formed by FIFO, SRAM, or the like.

Figure 3:
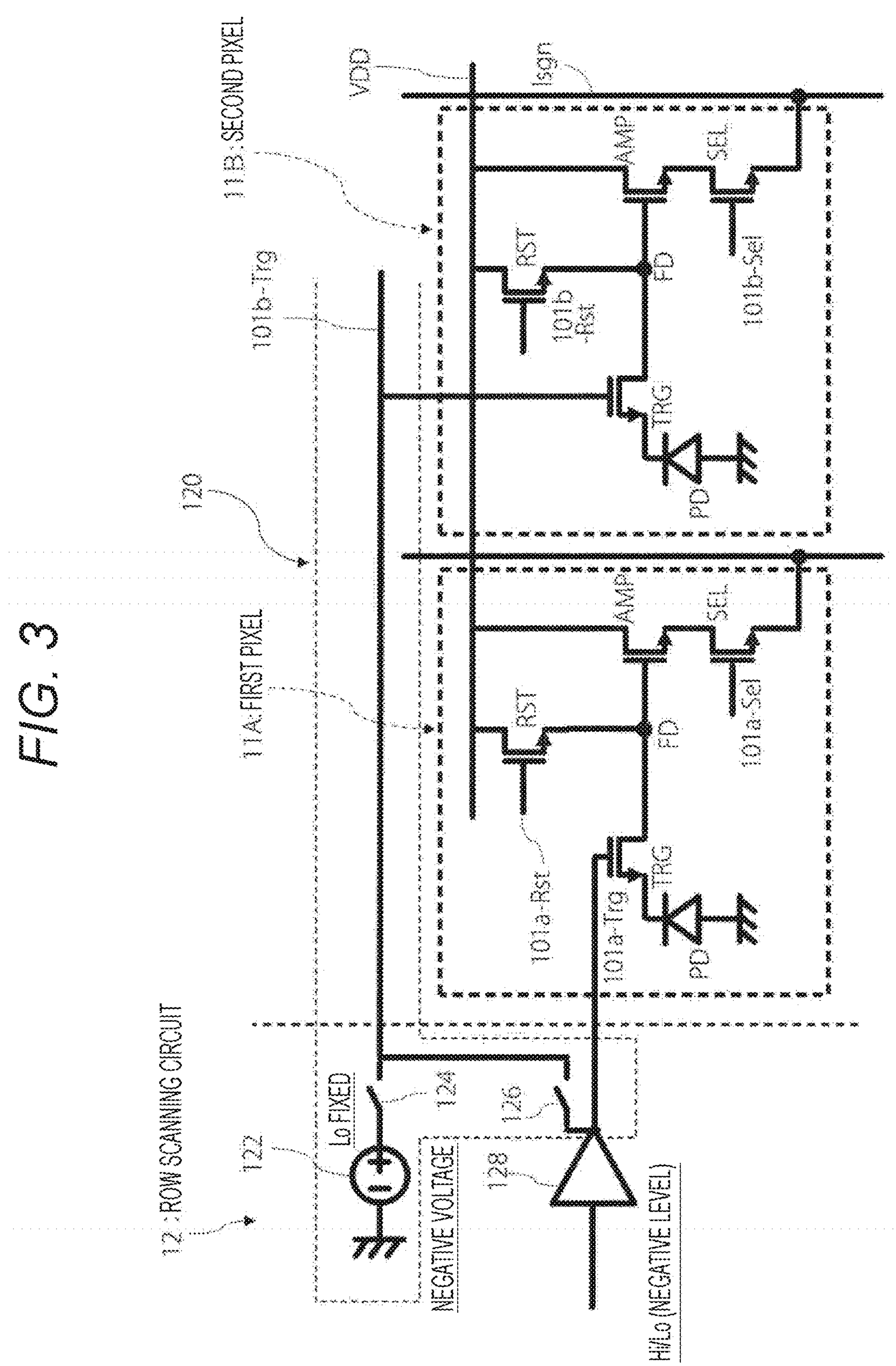
FIG. 3 is a diagram illustrating a circuit configuration example of a pixel.

FIG. 3 is a diagram illustrating a circuit configuration example of the pixel according to the present embodiment. As illustrated in FIG. 3, the first pixel 11A and the second pixel 11B according to the present embodiment include a photodiode PD, a transfer transistor TRG, a reset transistor RST, an amplification transistor AMP, a selection transistor SEL, and a floating diffusion (FD). Furthermore, the row scanning circuit 12 includes a power supply 122, a plurality of switches 124, 128, and a buffer 126. Note that the photodiode PD according to the present embodiment corresponds to a photoelectric conversion element.

Furthermore, a control line 101*a*-Trg is connected to a gate of a transfer transistor TRG of the first pixel 11A. Similarly, a control line 101*a*-Rst is connected to a gate of a reset transistors RST of the first pixel 11A. Further, a control line 101*a*-Sel is connected to a gate of a selection transistor SEL of the first pixel 11A. That is, a bundle of the control lines 101*a*-Trg, 101*a*-Rst, and 101*a*-Sel corresponds to, for example, the row scanning control line 101*a*.

Furthermore, a control line 101*b*-Trg is connected to a gate of a transfer transistor TRG of the second pixel 11B. Similarly, a control line 101*b*-Rst is connected to a gate of a reset transistor RST of the second pixel 11B. Further, a control line 101*b*-Sel are connected to a gate of a selection transistor SEL of the second pixel 11B. That is, a bundle of the control lines 101*b*-Trg, 101*b*-Rst, and 101*b*-Sel corresponds to, for example, the row scanning control line 101*b*. Note that the row scanning control line 101*a* according to the present embodiment corresponds to a first control line, and the row scanning control line 101*b* corresponds to a second control line.

Here, details of the first pixels 11A will be described. A photoelectric conversion element PD generates and accumulates signal charges (here, electrons) of an amount corresponding to the amount of incident light. Hereinafter, a case where the signal charge is an electron and each transistor is an N-type transistor will be described, but the present invention is not limited thereto. For example, the signal charge may be a hole, or each transistor may be a P-type transistor. Furthermore, the present embodiment is also effective in a case where each transistor is shared among a plurality of photoelectric conversion elements, or a case where a three-transistor (3Tr) pixel not including a selection transistor is adopted.

The transfer transistor TRG is connected between the photoelectric conversion element PD and a floating diffusion FD, and is controlled by the control line 101*a*-Trg. The transfer transistor TRG is selected in a period in which the control line 101*a*-Trg is at a high level (Hi) and rendered conductive, and transfers the electrons photoelectrically converted by the photoelectric conversion element PD to the FD. On the other hand, during a low level (Lo) period, a negative level voltage is applied and a non-conductive state is obtained.

The reset transistor RST is connected between a power supply line VDD and the floating diffusion FD, and is controlled through the control line 101*a*-Rst. The reset transistor RST is selected during a period in which the control line 101*a*-Rst is at a high level (Hi) and rendered conductive, and resets the FD to a potential of the power supply line VDD. On the other hand, during a low level (Lo) period, a negative level voltage is applied and a non-conductive state is obtained.

The amplification transistor AMP and the selection transistor SEL are connected in series between the power supply line VDD and the output signal line LSGN. The floating diffusion FD is connected to a gate of the amplification transistor AMP, and the selection transistor SEL is controlled through the control line 101*a*-Sel. The selection transistor SEL is selected during a period in which the control line 101*a*-Sel is at a high level (Hi) and rendered conductive. As a result, the amplification transistor AMP outputs a signal Vsl corresponding to a potential of the floating diffusion FD to the output signal line LSGN. On the other hand, during a low level (Lo) period, a negative level voltage is applied and a non-conductive state is obtained.

Here, details of the second pixel 11B will be described. A circuit configuration of the second pixel 11B is also similar to the circuit configuration of the first pixel 11A. However, the second pixel 11B is different from the first pixel 11A in including a control system 120. That is, the power supply 122 and the buffer 126 are connected to the control line 101*b*-Trg connected to a gate of the transfer transistor TRG of the second pixel 11B through the plurality of switches 124 and 128.

As illustrated in FIG. 3, in a case of the first mode of the second pixel 11B, the switch 124 is not connected and the switch 126 is connected. As a result, the second pixel 11B can perform control drive in the first state similar to that of the first pixel 11A. That is, in the first mode, the second pixel 11B can perform normal imaging.

As described above, the second pixel 11B according to the present embodiment has a plurality of modes by controlling the transfer of the signal charge of the photodiode PD by the control line 101*b*-Trg. For this reason, like a general so-called shielding pixel, a configuration of a shielding object for the photodiode PD is unnecessary, and a semiconductor process when the configuration of the imaging element 10 is performed is simplified. Furthermore, according to an imaging condition, normal imaging can be performed using the second pixel 11B, so that a decrease in resolution and imaging range is suppressed.

On the other hand, in the case of the second mode of the second pixel 11B, the switch 124 is connected and the switch 126 is disconnected. As a result, a negative voltage is always applied to the transfer transistor TRG of the second pixel 11B, and the control line 101*b*-Trg is always at a low level (Lo). Therefore, an electrically disconnected state is maintained between the photodiode PD of the second pixel 11B and floating diffusion (FD). As can be seen, in the case of the second mode of the second pixel 11B, a second state similar to a state in which the photodiode PD of the second pixel 11B is shielded from light is maintained. That is, in the second mode, the second pixel 11B can acquire black level information.

As illustrated in FIG. 2 again, the row scanning circuit 12 drives the pixels 11A and 11B through the row scanning control lines 101*a* and 101*b* in a shutter row and a reading row according to the control of the shutter control unit and the reading control unit of the timing control circuit 15. According to an address signal, the row scanning circuit 12 outputs row selection signals RD and SHR of the row addresses of a read row from which the signal is read and a shutter row from which the charge accumulated in the photoelectric conversion element PD is discarded and reset.

The column processing unit 13 reads the signal VSL output to the output signal line LSGN in accordance with a control signal from a sensor controller (not illustrated), outputs a read signal to the transfer line LTRF in accordance with column scanning of the column scanning circuit 14, and outputs the read signal to the outside by the output IF circuit 16. The column processing unit 13 performs predetermined processing on the signal VSL output from each pixel circuit 110A of the read row selected by the driving of the row scanning circuit 12 through the output signal line LSGN, and temporarily holds, for example, the pixel signal after the signal processing.

For example, a circuit configuration including a sample hold circuit that samples and holds a signal output through the output signal line LSGN can be applied to the column processing unit 13. Alternatively, the column processing unit 13 includes a sample and hold circuit, and a circuit configuration including a function of removing fixed pattern noise unique to pixels such as reset noise and threshold variation of an amplification transistor by correlated double sampling (CDS) processing can be applied. In addition, a configuration in which the column processing unit 13 has an analog-to-digital (AD) conversion function and a signal level is a digital signal can be applied.

In the example of FIG. 1, the column processing unit 13 is configured as a column analog digital converter (ADC) unit in which an AD converter (ADC) 13 is arranged for each column. The column ADC unit performs AD conversion on a column basis (column basis), outputs a read signal of the data after the AD conversion to the transfer line LTRF according to scanning of the column scanning circuit 14, and outputs the read signal to the outside by the output IF circuit 16.

FIG. 4 is a diagram illustrating a configuration example of the column ADC unit according to the present embodiment. Each ADC 13-1 (see FIG. 1) includes a comparator 132 that compares a reference voltage Vslop, which is a ramp waveform (RAMP) obtained by changing a reference voltage generated by the DAC 170 stepwise, with an analog signal VSL obtained from a pixel through an output signal line LSGN for each row line.

Each ADC 13-1 includes a counter 133 that counts a comparison time of the comparator 132 and a memory (latch) 134 that holds a count result of the counter 133. The column processing unit 13 has a multi-bit, for example, 10 bit digital signal conversion function, and is arranged for each output signal line (vertical signal line) LSGN to configure a column-parallel ADC block. An output of each latch 134 is connected to a transfer line LTRF having a plurality of bit widths.

In the column processing unit 13, the signal VSL read to the output signal line LSGN is compared by the comparator 132 arranged for each column (for each column). At this time, similarly to the comparator 132, the counter 133 arranged for each column operates, and changes while making a one-to-one correspondence between a reference voltage Vslop that is a ramp waveform and a count value, thereby converting an analog signal potential VSL of the output signal line LSGN into a digital signal.

An ADC 131 converts a change in the reference voltage Vslop, as a change in voltage, into a change in time, and counts the time with a certain period (clock) to convert the count into a digital value. Then, when the analog signal VSL and the reference voltage Vslop intersect, an output of the comparator 132 is inverted, and the input clock of the counter 133 is stopped, or the clock whose input has been stopped is input to the counter 133, and the AD conversion is completed.

The timing control circuit 15 generates timings necessary for processing of a pixel array unit 110, the row scanning circuit 12, the column processing unit 13, the column scanning circuit 14, the output IF circuit 16, and the like.

In the imaging element 10 (see FIG. 1), the pixel array unit 11 is controlled in units of columns. Therefore, for example, (t+1) pixels from 11-00 to 11-0*t* are simultaneously controlled in parallel by the row scanning control lines 101*a*-0 and 101*b*-0, and are input to the column ADC unit 13 through the output signal line LSGN connected to the pixel array unit 110. Accordingly, in the first mode, the first pixel 11A and the second pixel 11B are similarly controlled. In the second mode, the first pixel 11A and the second pixel 11B are similarly controlled except that the charge of the B photoelectric conversion element PD of the second pixel 11 is not transferred.

In the column ADC unit 13, AD conversion is performed in units of columns, and the data after the AD conversion is transferred to the output IF circuit 16 by the column scanning circuit 14. The output IF circuit 16 is formatted so as to be receivable by a signal processing circuit at a subsequent stage, and outputs data. As a result, in the first mode, normal image data captured by the first pixel 11A and the second pixel 11B is acquired. On the other hand, in the second mode, the data of the pixel corresponding to the first pixel 11A is acquired as the black-level image data corresponding to an imaging time of the first pixel 11A.

Figure 5:
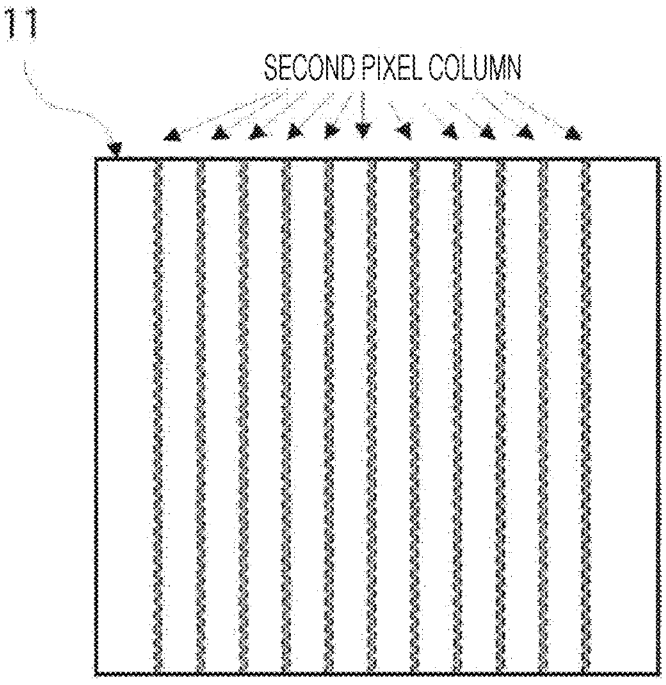
FIG. 5 is a diagram illustrating an arrangement example of second pixels in a pixel array unit.

FIG. 5 is a diagram illustrating an arrangement example of the second pixels 11B of the pixel array unit 11. In the example of FIG. 5, the second pixels 11B are arranged in a row in the entire pixel array unit 11. In such an arrangement, as described later with reference to FIG. 7, the black level can be corrected with higher accuracy.

Figure 6:
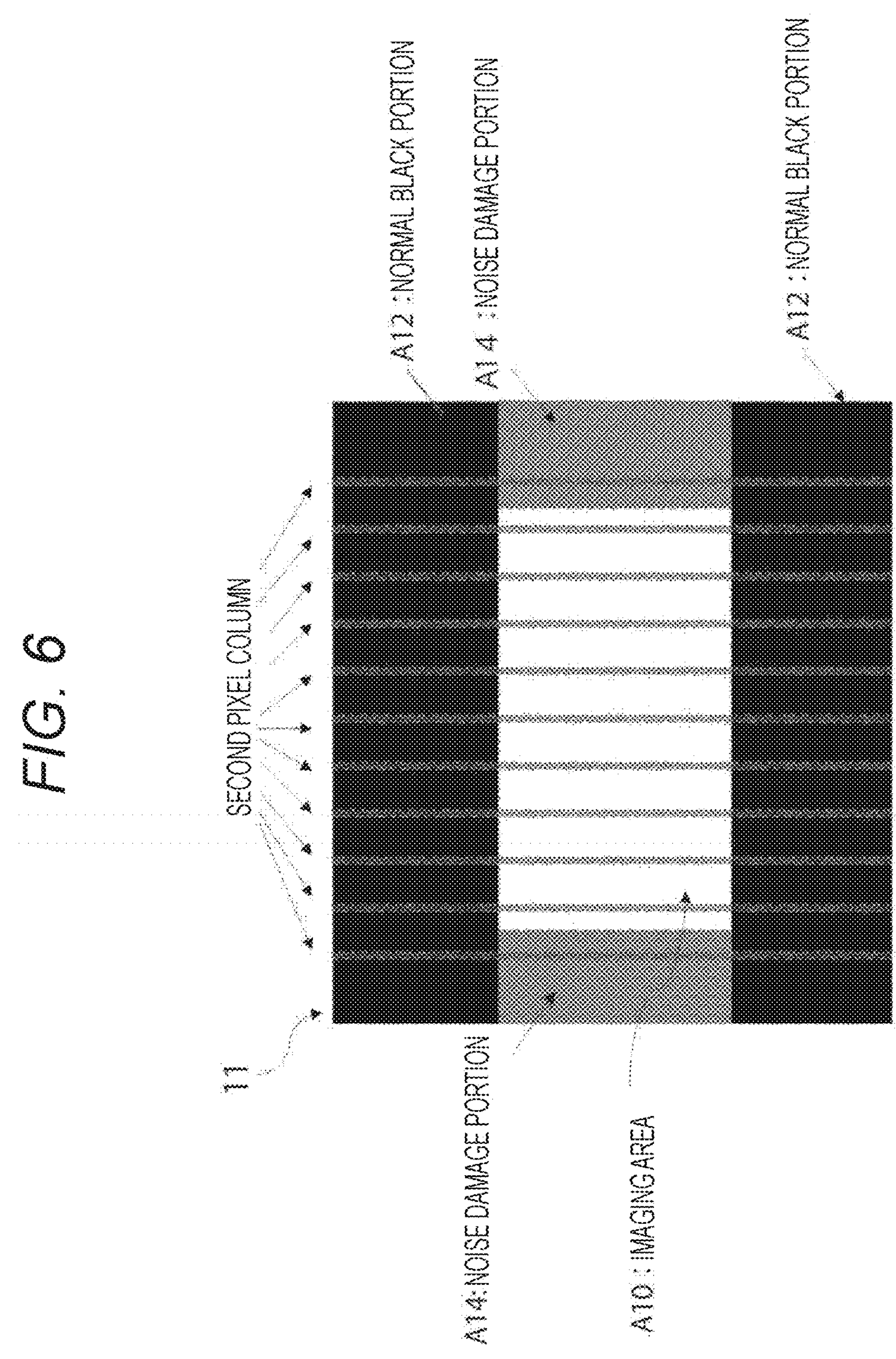
FIG. 6 is a diagram illustrating an example of image data in a case where imaging is performed in a first mode as a comparative example.

FIG. 6 is a diagram illustrating an example of image data in a case where imaging is performed in the first mode as a comparative example. FIG. 6 illustrates an example of imaging through an aperture, for example. That is, imaging light enters the imaging area A10, and the other areas are shielded from light. In such a case, according to the light amount of the imaging area A10, the black level may be different between the normal black portion A12 which is an area in a row different from the imaging area A10 and a noise damage portion A14 which is a light shielding area in the same row as the imaging area A10. Such a phenomenon in which the black level fluctuates is referred to as streaking. This is considered to be because, for example, output values of pixels in the same row have a correlation due to a parasitic capacitance of each wiring in the row direction.

Figure 7:
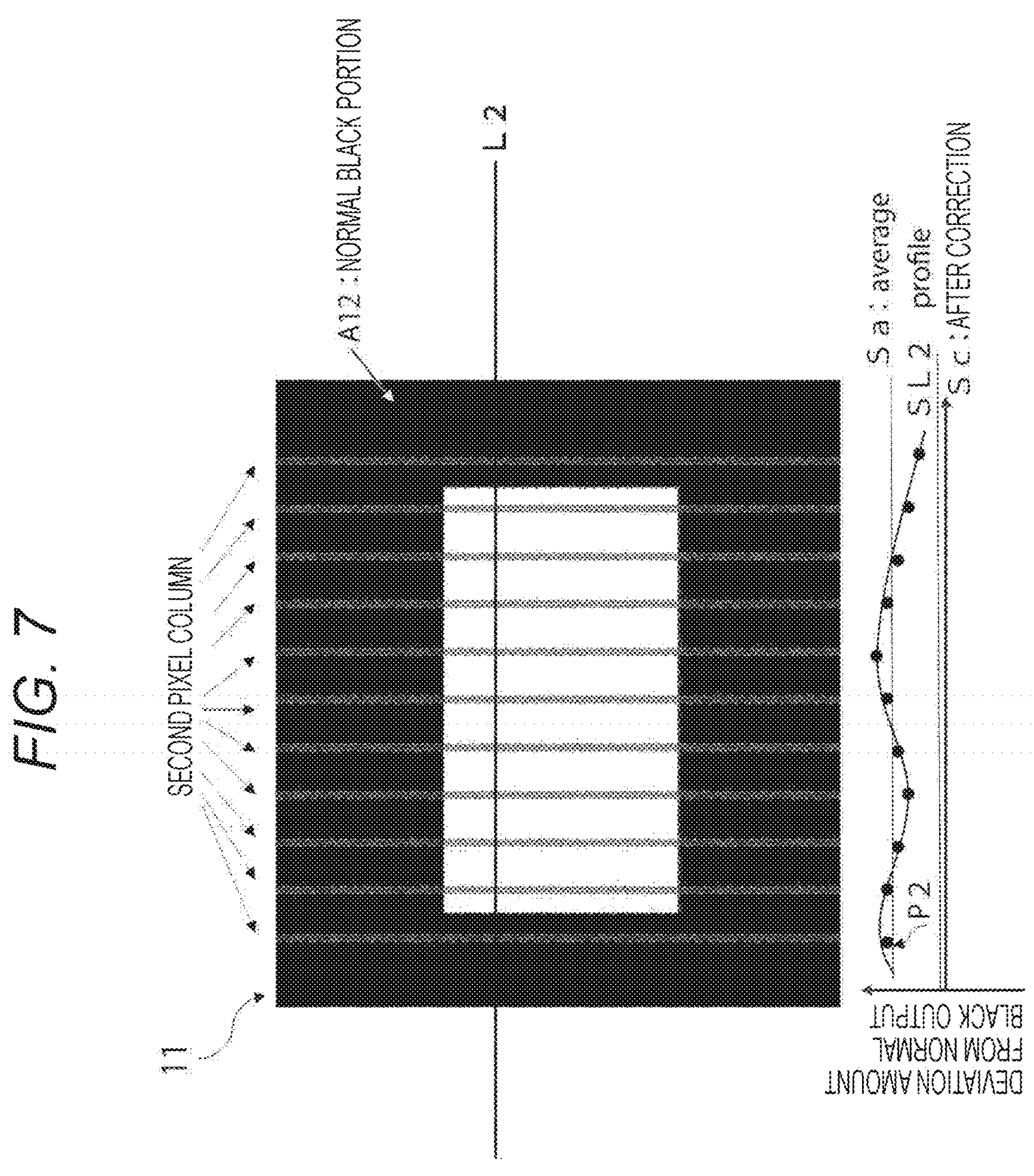
FIG. 7 is a diagram illustrating an example of corrected image data in a case where imaging is performed in a second mode.

FIG. 7 is a diagram illustrating an example of corrected image data in a case where imaging is performed in the second mode. A horizontal axis of a graph indicates a position on a row of the pixel array unit 11, and a vertical axis indicates a difference from an average value for each row of the normal black portion A12 (see FIG. 6). A plurality of points P2 indicates pixel values of the second pixels 11B in a line L2. In addition, a signal SL2 indicates a line obtained by spline-complementing the plurality of points P2, for example. In addition, a signal line Sa indicates an example in which the pixel values of the second pixels 11B in the line L2 are added in a row direction to generate an average value. Furthermore, a signal line Sc indicates a spline-complemented line obtained by subtracting the signal SL2 from the pixel value of the second pixel 11B in the line L2.

As illustrated in FIG. 7, the signal processing circuit 30 (see FIG. 1) performs generation processing of the signal SL2 using the pixel value of the second pixels 11B in the line L2 for each pixel. For example, the signal processing circuit 30 performs spline complement as described above to generate the signal SL2 for each pixel. The signal processing circuit 30 according to the present embodiment performs spline complement to generate the signal SL2 for each pixel, but is not limited thereto. For example, least square approximation may be used.

For example, the signal processing circuit 30 generates the signal SL2 for each row and subtracts the signal SL2 from each pixel value of the pixel array unit 11 for each row. More specifically, first, a subtraction value is calculated by subtracting a second average value of the pixel outputs of the second pixels 11B in the row to be corrected from a first average value of the pixel outputs of the second pixels 11B in the normal black portion A12. For example, an area of the normal black portion A12 can be acquired from aperture information of an optical system in an electronic device 300 (see FIG. 14 described later). Then, in a case where the subtraction value>the predetermined threshold (Th1), the correction processing of the row is performed. As a result, it is possible to perform only the correction of the black level in the row of a high luminance area.

For the correction target row, the signal processing circuit 30 performs an operation of, for example, corrected output of each pixel=noise damage unit output−signal value of spline×coefficient (register). Through such processing, as illustrated in FIG. 7, the black level of the noise damage portion A14 (see FIG. 6) becomes equivalent to that of the normal black portion A12 (see FIG. 6). As a result, the fluctuation of the black level is suppressed, and the streaking is suppressed. Note that a value such as 0.8 to 1.0 is set as the coefficient, for example.

The signal processing circuit 30 may average the pixel values of the second pixels 11B for each row and subtract the average from each pixel value of the pixel array unit 11 for each row. For the correction target row, the signal processing circuit 30 performs an operation of, for example, corrected output of each pixel=noise damage unit output−average value of deviation amount×coefficient (register). In this case, the black level can be corrected at a higher speed. Note that a value such as 0.8 to 1.0 is set as the coefficient, for example.

In addition, the signal processing circuit 30 (see FIG. 1) corrects the pixel value of the second pixel 11B for which image information cannot be obtained in the second mode by using information of peripheral pixel values. For example, it is possible to perform processing similar to so-called defective pixel correction or the like. As a result, also, in the second mode, in the image data output from the pixel array unit 11, the pixel value of the second pixel 11B becomes the same value as that of the surrounding image, and becomes inconspicuous.

Figure 8:
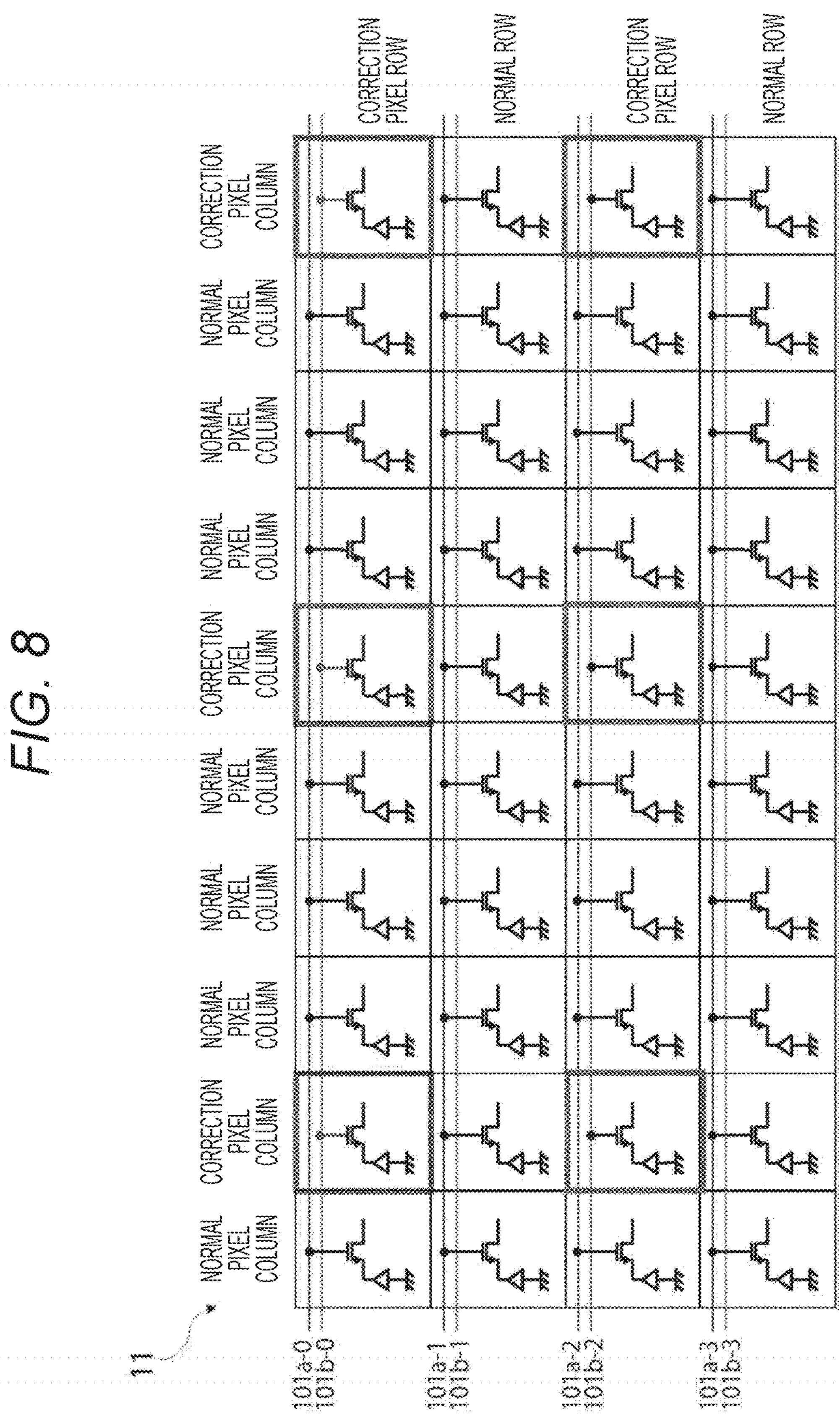
FIG. 8 is a diagram illustrating another arrangement example of second pixels in the pixel array unit.

FIG. 8 is a diagram illustrating another arrangement example of the second pixel 11B in the pixel array unit 11. In the example of FIG. 8, the second pixels 11B are arranged every two rows. In such an arrangement, the correction of the black level of the row without the second pixel 11B is performed using the information of the black levels of the second pixels 11B in the preceding and subsequent rows. For example, the signal processing circuit 30 subtracts the value of the black level of each pixel spline-complemented with the black level of the upper second pixel 11B from the corresponding pixel. In this case, since the fluctuation of the black level of each row is correlated, it is possible to increase the processing speed while suppressing the decrease in the interpolation accuracy.

Figure 9:
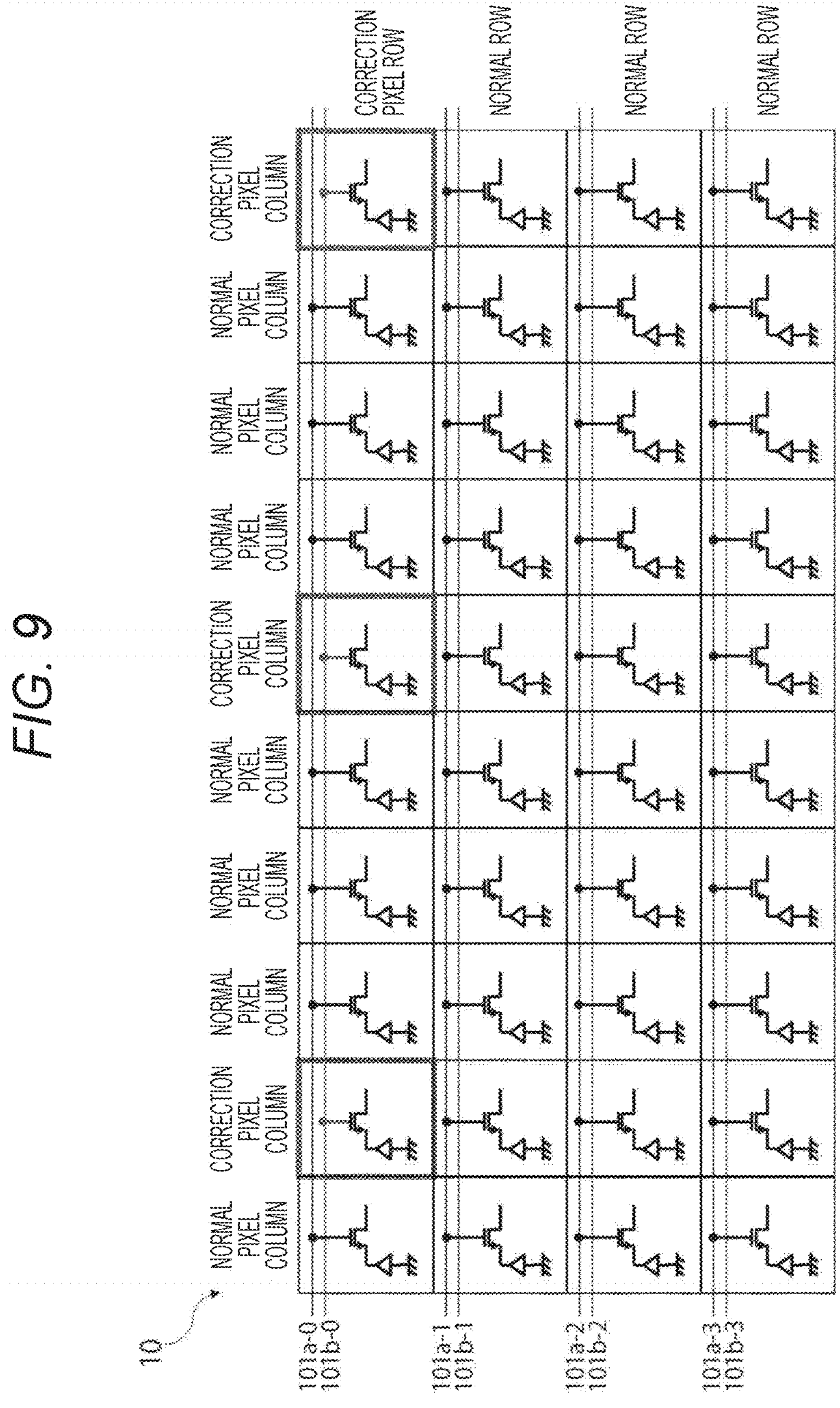
FIG. 9 is a diagram illustrating an example in which second pixels of the pixel array unit are arranged in rows at end portions.

FIG. 9 is a diagram illustrating an example in which the second pixels 11B of the pixel array unit 11 are arranged in a row at an end portion. In the example of FIG. 9, the second pixel 11B is arranged at the upper end. In such an arrangement, the correction of the black level of the row without the second pixel 11B is performed using the information of the black level of the second pixel 11B at the upper end. For example, the signal processing circuit 30 subtracts the value of the black level of each pixel spline-complemented with the black level of the upper end portion second pixel 11B from the corresponding pixel of each row. In this case, the fluctuation of the black level of each row can be made faster.

Figure 10:
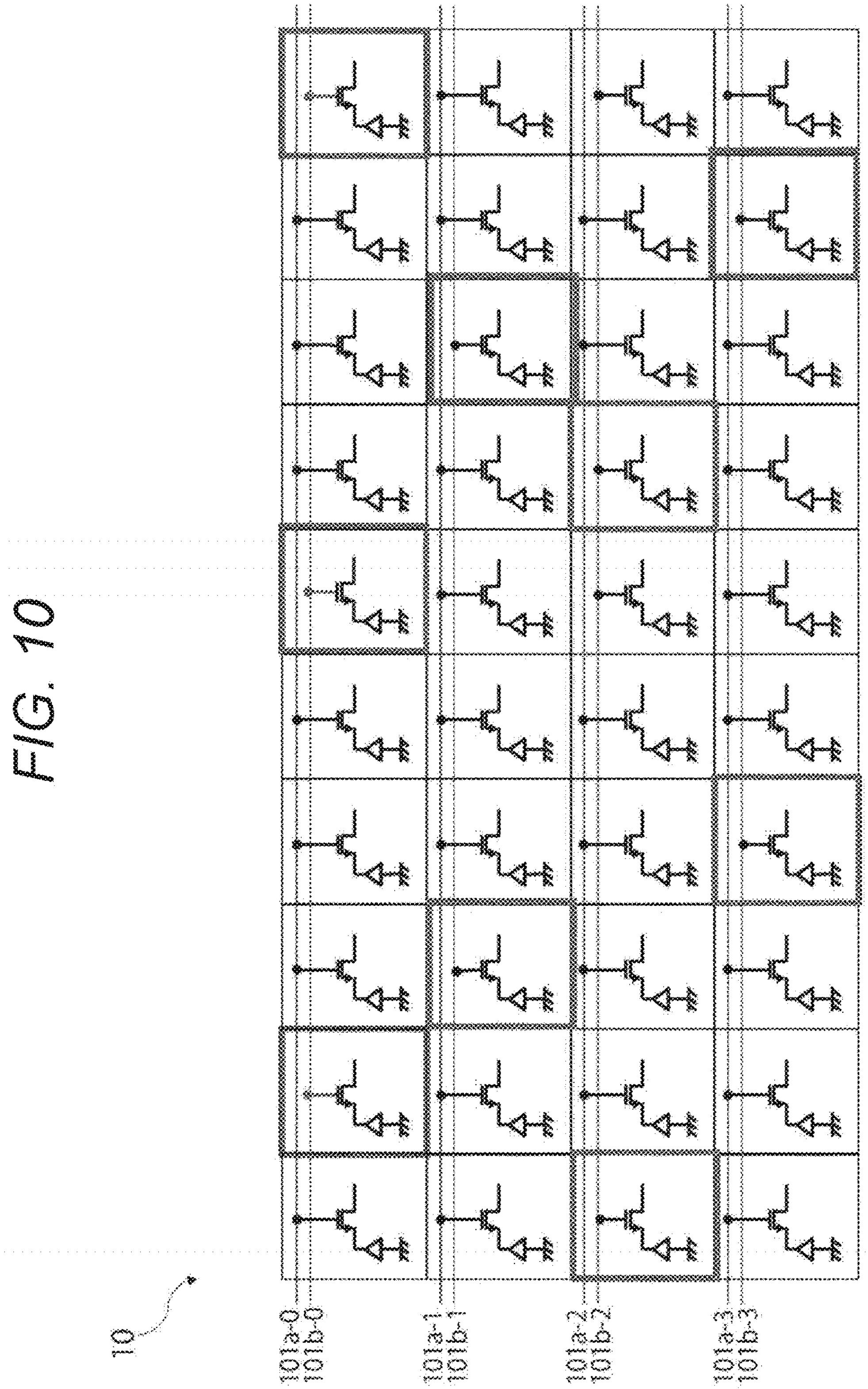
FIG. 10 is a diagram illustrating still another arrangement example of the second pixels in the pixel array unit.

FIG. 10 is a diagram illustrating still another arrangement example of the second pixels 11B in the pixel array unit 11. In the example of FIG. 10, the arrangement of the second pixels 11B in one row is made irregular. In such an arrangement, the positions of the second pixels 11B from which image information cannot be obtained in the second mode becomes irregular, and the correction of the second pixels 11B becomes inconspicuous in the processed image after the correction of the second pixels 11B.

Figure 11:
FIG. 11 is a diagram schematically illustrating an example in which a configuration example of the pixel array unit is different.
Figure 11:
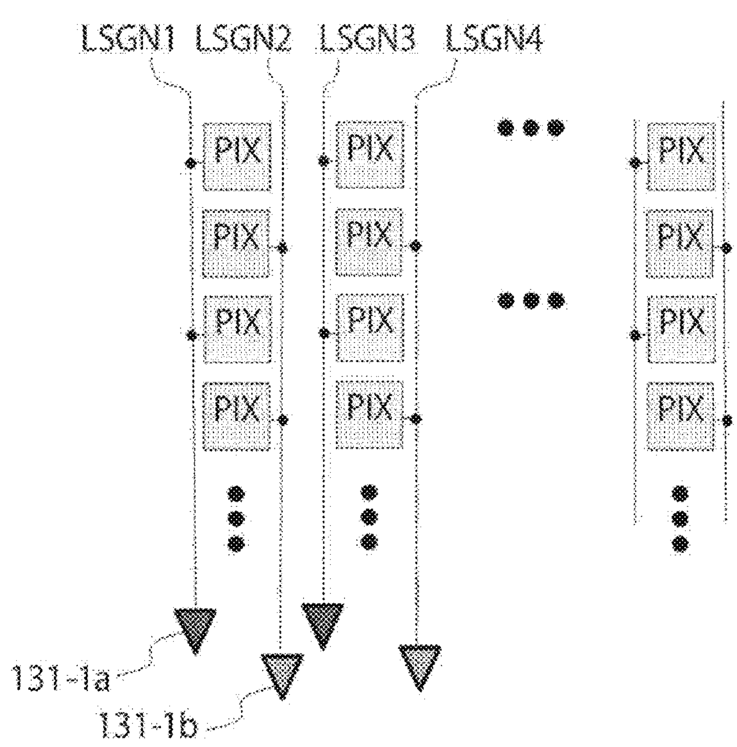

FIG. 11 is a diagram schematically illustrating an example in which a configuration example of the pixel array unit 11 is different. As illustrated in FIG. 11, in each pixel of the pixel array unit 11, each pixel arranged in the same column is connected to different signal lines LSG1 to LSG4 for each pixel row. The ADCs 13-1*a* and 13-1*b* are connected to the respective signal lines LSG1 to LSG4. As a result, the signal of each pixel 11 can be read out at a higher speed.

Figure 12:
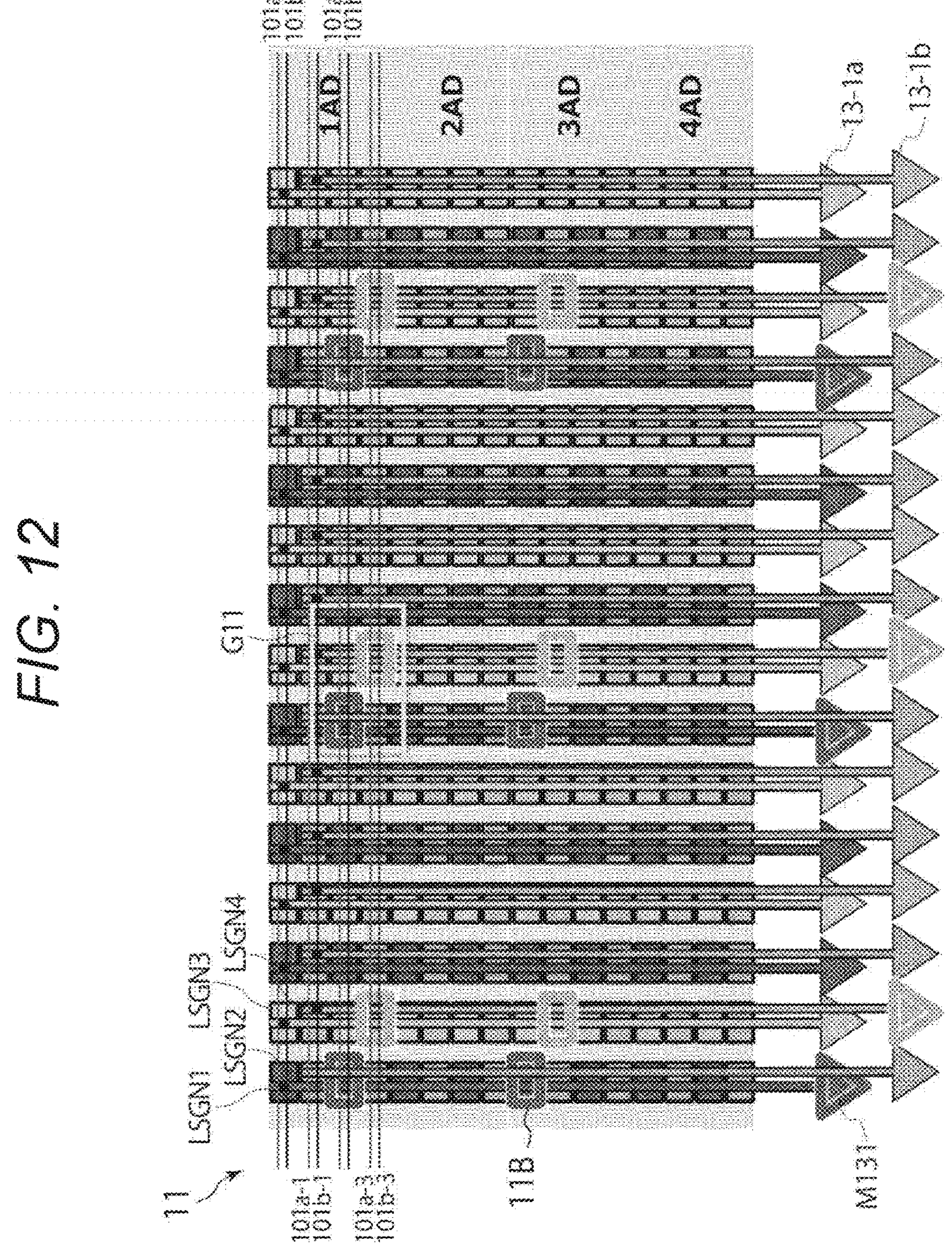
FIG. 12 is a diagram illustrating an arrangement example of the second pixels in the pixel array unit illustrated in FIG. 11.

FIG. 12 is a diagram illustrating an arrangement example of the second pixels 11B in the pixel array unit 11 illustrated in FIG. 11. Each pixel of the pixel array unit 11 illustrated in FIG. 12 is a Bayer array in units of four pixels as illustrated in G11. In the Bayer array, a red pixel, a blue pixel, and two green pixels are included. These pixels receive light through corresponding red filter, blue filter, and green filter.

An ADC conversion unit 13*a* connected to one signal line of the pixel column and an ADC conversion unit 13*b* connected to the other signal line are configured. In FIG. 12, a double square indicates the second pixel 11B, and a double inverse triangle M131 indicates an ADC 13-1 (see FIG. 1) to which at least one second pixel 11B is connected. In such an arrangement example, the AD conversion processing may be performed in units of areas of 1AD to 4AD. In this case, for example, the correction of the 2AD area can be performed using the information of the second pixel 11B in the 1AD area, and the correction of the 4AD area can be performed using the information of the second pixel 11B in the 3AD area. As a result, the correction processing is speeded up.

Figure 13:
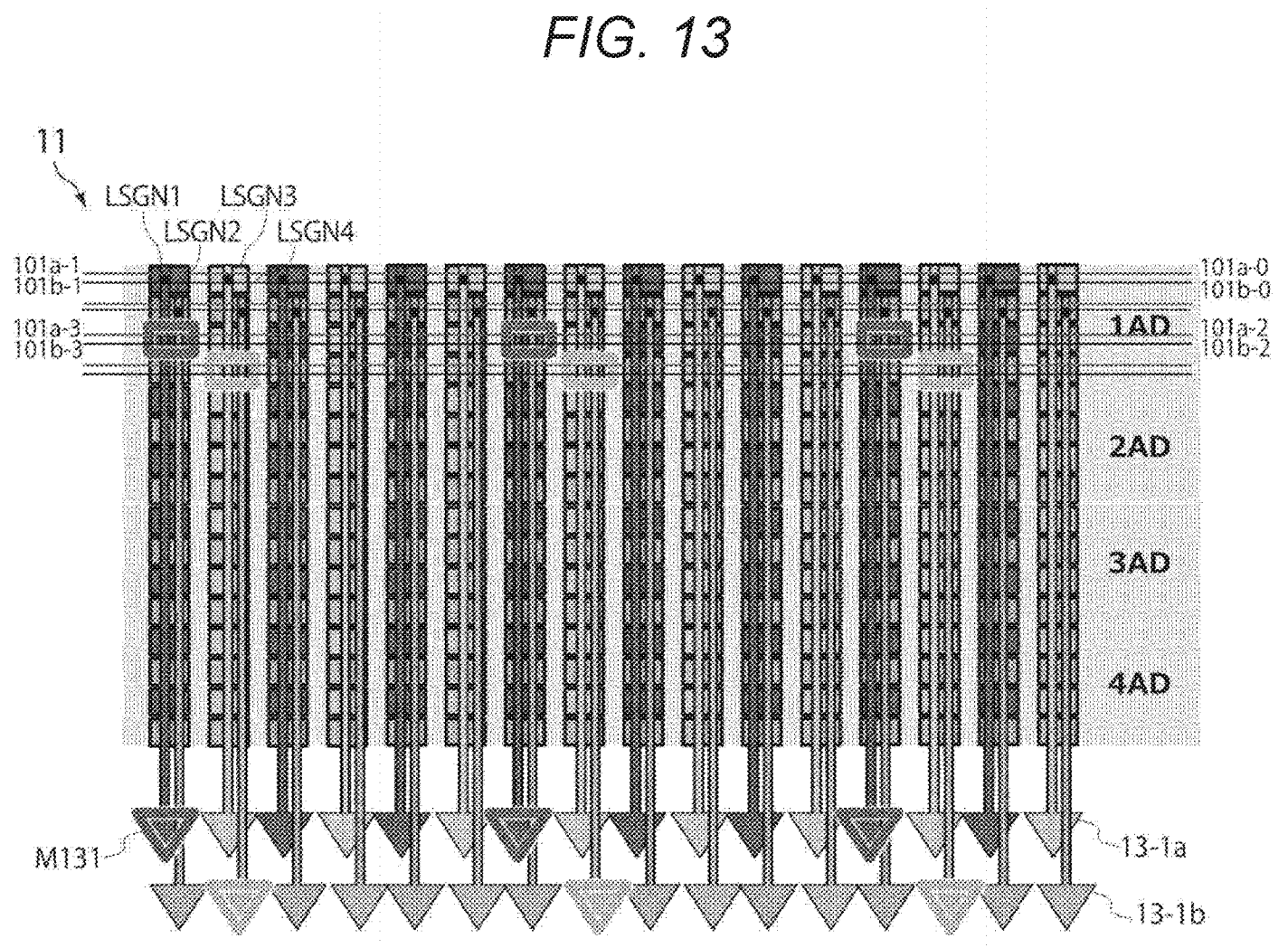

FIG. 13 is a diagram illustrating an arrangement example of another second pixel 11B in the pixel array unit 11 illustrated in FIG. 11. In the pixel array unit 11 illustrated in FIG. 13, the second pixel 11B is arranged in the 1AD area. In this case, for example, the correction of the 2AD to 4AD areas can be performed, for example, using the information of the second pixel 11B of the 1AD area. As a result, the correction processing is further speeded up.

As described above, according to the present embodiment, the pixel array unit 11 includes the plurality of first pixels 11A that performs normal imaging, the second pixel 11B capable of acquiring information at the black level, the first control line 101*a* that controls charge transfer of the plurality of first pixels 11A, and the second control line 101*b* different from the first control line that controls charge transfer of the second pixel 11B. As a result, the second pixel 11B can have an imaging mode different from that of the first pixel 11A by controlling the transfer of the signal charge of the photodiode PD by the control line 101*b*. Therefore, the black level information can be acquired as the second mode by the operation drive similar to that of the first pixel 11A. In addition, since normal imaging can be performed using the second pixel 11B as the first mode, reduction in resolution and imaging range is suppressed.

Second Embodiment

Figure 14:
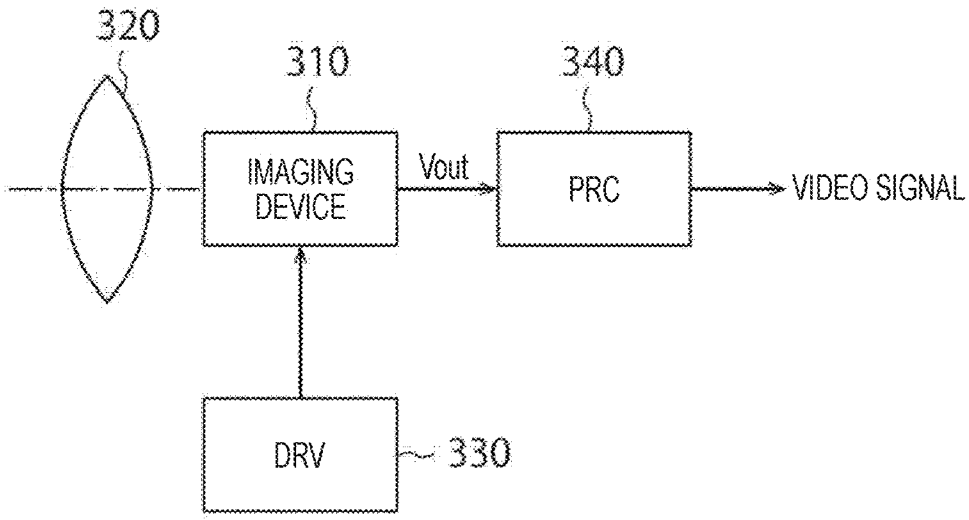
FIG. 14 is a diagram illustrating an example of a configuration of a camera system to which an imaging element is applied.

FIG. 14 is a diagram illustrating an example of a configuration of an electronic device to which the imaging element 10 according to the second embodiment of the present technology is applied.

An electronic device 300 is a camera system, and includes an imaging device 310 to which the imaging element 10 according to the present embodiment is applicable as illustrated in FIG. 14. Furthermore, the electronic device 300 includes an optical system that guides incident light (forms a subject image) to a pixel area of the imaging element 10 in the imaging device 310, for example, a lens 320 that forms an image of the incident light (image light) on an imaging surface. The electronic device 300 includes a drive circuit (DRV) 330 that drives the imaging device 310 and a signal processing circuit (PRC) 340 that processes an output signal of the imaging device 310.

The drive circuit 330 includes a timing generator (not illustrated) that generates various timing signals including a start pulse and a clock pulse that drive a circuit in the imaging device 310, and drives the imaging device 310 with a predetermined timing signal.

Furthermore, the signal processing circuit 340 performs predetermined signal processing on the output signal of the imaging device 310. The image signal processed by the signal processing circuit 340 is recorded in a recording medium such as a memory, for example. Image information recorded on the recording medium is hard-copied by a printer or the like. Furthermore, the image signal processed by the signal processing circuit 340 is displayed as a moving image on a monitor including a liquid crystal display or the like.

As described above, in an imaging device such as a digital still camera, the CMOS image sensor (imaging element) 10 described above is mounted as the imaging device 310, so that a highly accurate camera with low power consumption can be realized.

1. Application Example

The technology according to the present disclosure can be applied to various products. For example, the technology according to the present disclosure may also be implemented as a device mounted on any kind of mobile body such as an automobile, an electric automobile, a hybrid electric automobile, a motorcycle, a bicycle, a personal mobility, an airplane, a drone, a ship, a robot, a construction machine, an agricultural machine (tractor), or the like.

Figure 15:
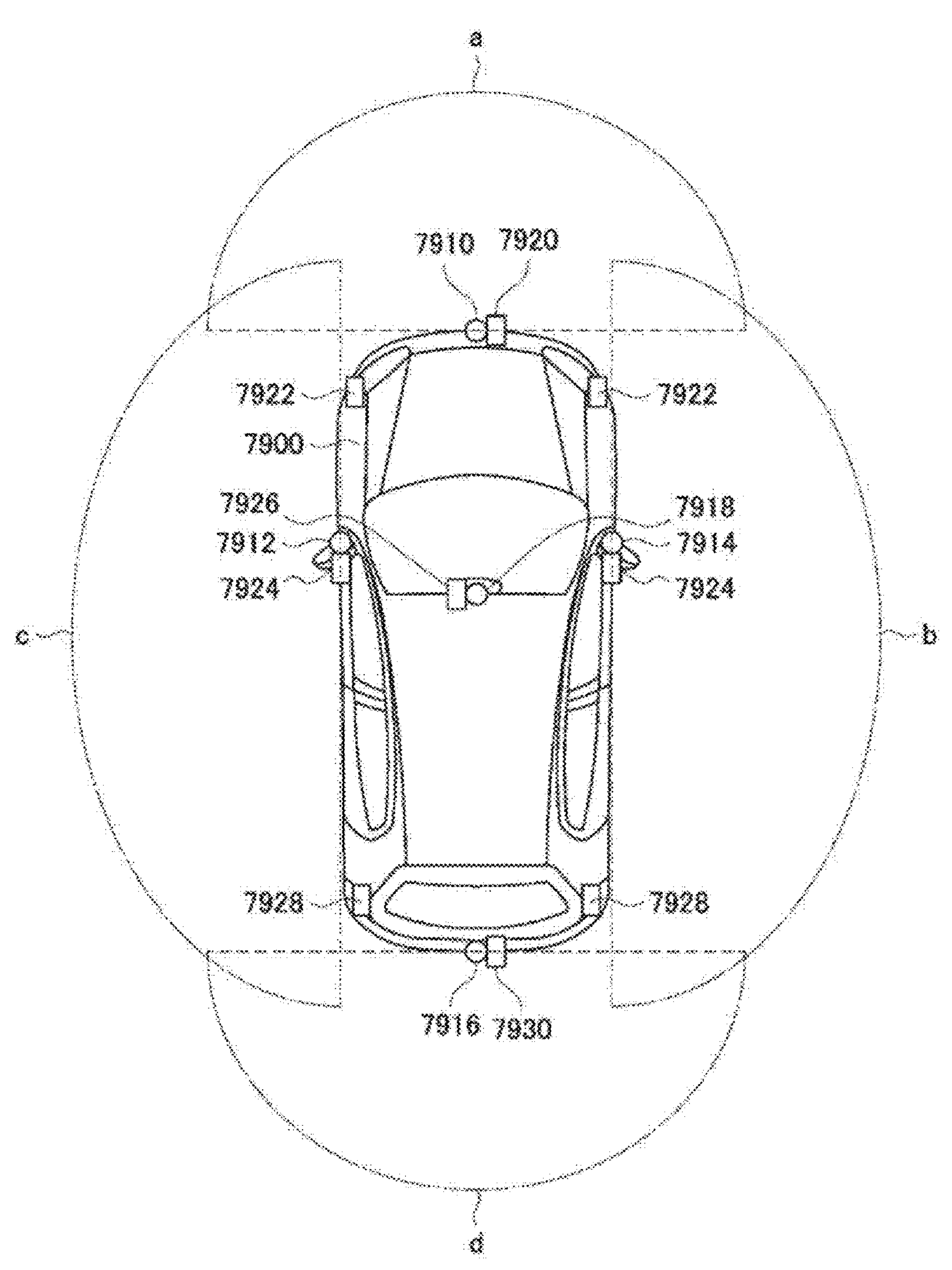
FIG. 15 is a block diagram illustrating an example of a schematic configuration of a vehicle control system.

FIG. 15 is a block diagram depicting an example of schematic configuration of a vehicle control system as an example of a vehicle control system 7000 to which the technology according to an embodiment of the present disclosure can be applied. The vehicle control system 7000 includes a plurality of electronic control units connected to each other via a communication network 7010. In the example illustrated in FIG. 15, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. In FIG. 15, a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690 are illustrated as a functional configuration of the integrated control unit 7600. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 16:
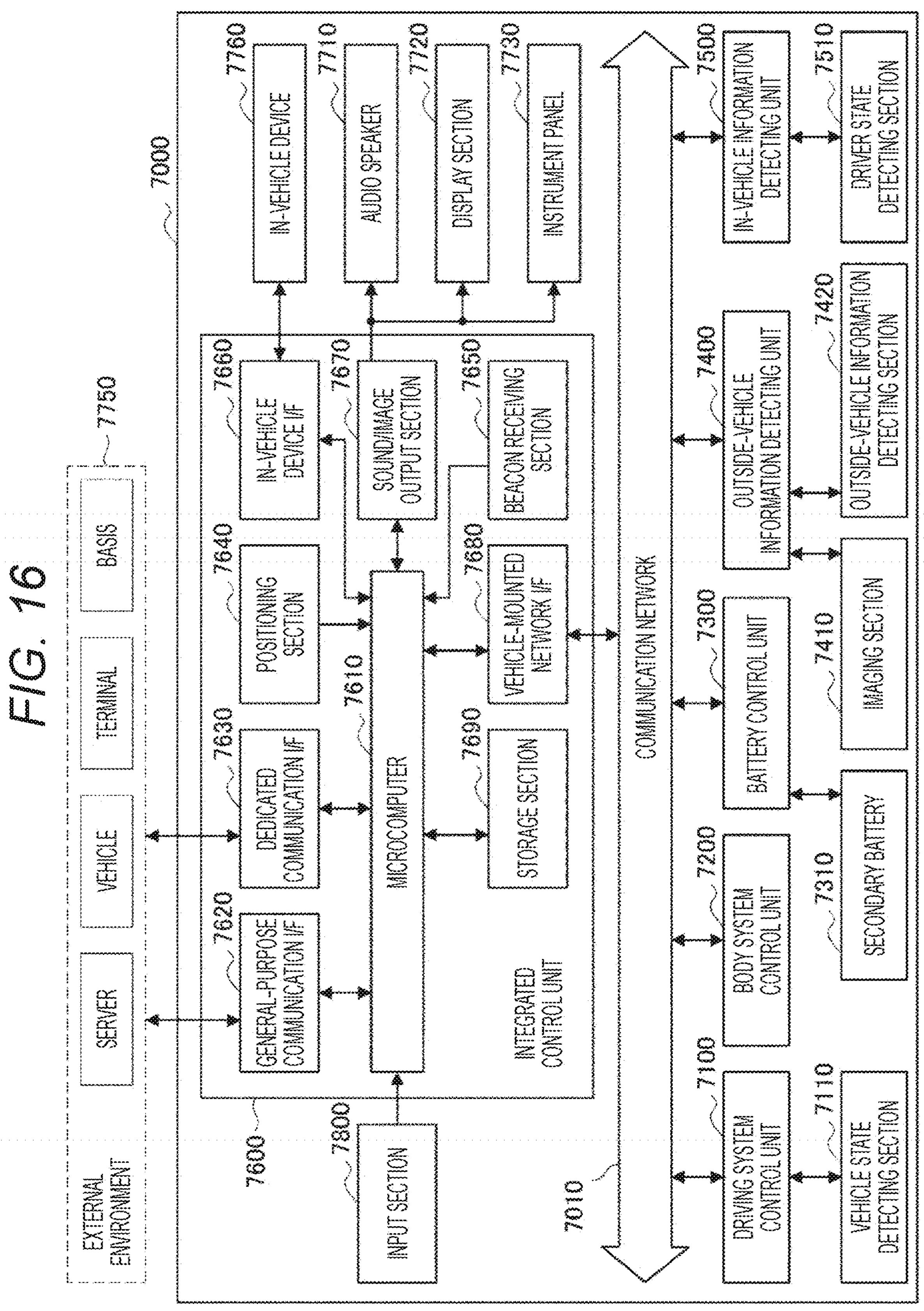
FIG. 16 is an explanatory diagram illustrating an example of installation positions of a vehicle exterior information detection unit and an imaging unit.

Here, FIG. 16 illustrates an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Note that FIG. 16 illustrates an example of the imaging range of each of the imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Referring back to FIG. 15, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 15, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Note that, in the example illustrated in FIG. 15, at least two control units connected through the communication network 7010 may be integrated as one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing each function of the present electronic device 300 including the imaging element 10 according to the present embodiment described with reference to FIG. 14 can be mounted on any control unit or the like. Furthermore, a computer-readable recording medium in which such a computer program is stored can be provided. The recording medium is, for example, a magnetic disk, an optical disk, a magneto-optical disk, a flash memory, or the like. Furthermore, the computer program described above may be distributed via, for example, a network without using a recording medium.

In the vehicle control system 7000 described above, the imaging element 10 according to the present embodiment described with reference to FIG. 1 can be applied to the imaging section 7410 of the application example illustrated in FIG. 15.

Note that the present technology may have the following configurations.

(1)

An imaging element including a pixel array unit in which a plurality of pixels including a photoelectric conversion element is arranged in a matrix, the pixel array unit including:

a plurality of first pixels that perform normal imaging;

a second pixel capable of acquiring black-level information;

a first control line that controls charge transfer of the plurality of first pixels; and a second control line that is different from the first control line and controls charge transfer of the second pixel.

(2)

The imaging element according to (1), in which the plurality of first pixels and the plurality of second pixels are arranged in a same row, the plurality of first pixels is connected to the first control line arranged corresponding to the same row, and the plurality of second pixels is connected to the second control line arranged corresponding to the same row.

(3)

The imaging element according to (1), in which the second pixel is capable of changing between a first mode in which normal imaging is performed and a second mode in which black level information is acquired under control of the second control line.

(4)

The imaging element according to (3), in which the second pixel further includes a floating diffusion configured to output electric charge photoelectrically converted by the photoelectric conversion element, and a transfer transistor connected to the photoelectric conversion element and the floating diffusion, and the second control line is connected to a gate of the transfer transistor.

(5)

The imaging element according to (4), in which the second control line supplies a low-level signal during a predetermined period during an imaging operation in the second mode.

(6)

The imaging element according to (4), in which in the first mode, the second control line supplies a high-level signal in a period corresponding to the predetermined period.

(7)

The imaging element according to (3), in which the second control line is connected to the first control line connected to the first pixel arranged in a same row through a first switching element.

(8)

The imaging element according to (7), in which the second control line is connected to a power supply that supplies a low-level signal through a second switching element.

(9)

The imaging element according to (8), in which in the first mode, the first switching element is brought into a conductive state and the second switching element is brought into a non-conductive state.

(10)

The imaging element according to (8), in which in the second mode, the first switching element is brought into a non-conductive state and the second switching element is brought into a conductive state.

(11)

The imaging element according to (1), in which a plurality of the second pixels is arranged in a plurality of predetermined columns of the pixel array unit.

(12)

The imaging element according to (1), in which the second pixels are arranged in a plurality of predetermined rows of the pixel array unit.

(13)

The imaging element according to (1), in which a plurality of the second pixels is arranged in a predetermined row at an end portion of the pixel array unit.

(14)

The imaging element according to (1), in which an arrangement position of the plurality of first pixels on a predetermined row is different from an arrangement position on a row of the plurality of second pixels in a row different from the predetermined row.

(15)

The imaging element according to (1), further including:

a row scanning circuit that drives the pixel array unit in units of rows to read pixel signals from the pixels; and a plurality of analog-to-digital conversion units that performs analog-to-digital conversion of the pixel signals for each column of the pixel array unit.

(16)

The imaging element according to (1), further including:

a pixel drive unit that drives the pixel array unit in units of rows to read pixel signals from the pixels; and a plurality of analog-to-digital conversion units that perform analog-to-digital conversion of the pixel signals of the pixels arranged in a column shape of the pixel array unit for each row.

(17)

The imaging element according to (16), in which the second pixel is arranged to correspond to a predetermined analog-to-digital conversion unit among the plurality of analog-to-digital conversion units.

(18)

The imaging element according to (3), further including a signal processing circuit that corrects an output value of each pixel of the pixel array unit on a basis of information of a black level acquired by the second pixel.

(19)

The imaging element according to (18), in which the signal processing circuit corrects the output value of each of the pixels in a case of the second mode.

(20)

An electronic device including:

the imaging element according to (1); and an optical system that supplies imaging light to the imaging element.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

10 Imaging element
11 Pixel array unit
11A First pixel
11B Second pixel
12 Row scanning circuit
13 Column processing unit
13-1 Analog-to-digital conversion unit ((ADC))
101*a* Row scanning control line (first control line)
101*b* Row scanning control line (second control line)
124 Switching element (second switching element)
126 Switching element (first switching element)
FD Floating diffusion
TRG Transfer transistor
PD Photodiode (photoelectric conversion element)
300 Electronic device

The invention claimed is:

1. An imaging element, comprising:

a pixel array unit that comprises:

a plurality of pixels, wherein each of the plurality of pixels includes a respective photoelectric conversion element, and the plurality of pixels includes:

a first plurality of pixels configured to perform a normal imaging process; and a second plurality of pixels configured to:

perform the normal imaging process in a first mode;

acquire black level information in a second mode; and switch between the first mode and the second mode;

a first control line configured to control charge transfer of a set of pixels of the first plurality of pixels; and a second control line configured to:

control charge transfer of a set of pixels of the second plurality of pixels; and control the switch between the first mode and the second mode, wherein the second control line is different from the first control line, the second control line is connected to the first control line through a first switching element, and the second control line and the set of pixels of the first plurality of pixels are associated with a same row of the pixel array unit.

2. The imaging element according to claim 1, wherein the set of pixels of the first plurality of pixels and the set of pixels of the second plurality of pixels are in the same row, the set of pixels of the first plurality of pixels is connected to the first control line, wherein an arrangement of the first control line corresponds to the same row, and the set of pixels of the second plurality of pixels is connected to the second control line, wherein an arrangement of the second control line corresponds to the same row.

3. The imaging element according to claim 1, wherein each of the second plurality of pixels includes a respective floating diffusion, the respective photoelectric conversion element is configured to generate an electric charge based on photoelectric conversion, the respective floating diffusion is configured to output the generated electric charge, each of the respective photoelectric conversion element and the respective floating diffusion is connected to a respective transfer transistor, and the second control line is connected to a gate of the respective transfer transistor of each of the set of pixels of the second plurality of pixels.

4. The imaging element according to claim 3, wherein in the second mode, the second control line is further configured to supply a low-level signal in a first period, and the first period is associated with an imaging operation.

5. The imaging element according to claim 4, wherein in the first mode, the second control line is further configured to supply a high-level signal in a second period, and the second period corresponds to the first period.

6. The imaging element according to claim 1, wherein the second control line is connected to a power supply that supplies a low-level signal through a second switching element.

7. The imaging element according to claim 6, wherein in the first mode, the first switching element is in a conductive state and the second switching element is in a non-conductive state.

8. The imaging element according to claim 6, wherein in the second mode, the first switching element is in a non-conductive state and the second switching element is in a conductive state.

9. The imaging element according to claim 1, wherein the second plurality of pixels is in a plurality of specific columns of the pixel array unit.

10. The imaging element according to claim 1, wherein the second plurality of pixels is in a plurality of specific rows of the pixel array unit.

11. The imaging element according to claim 1, wherein the set of pixels of the second plurality of pixels is in a row at an end portion of the pixel array unit.

12. The imaging element according to claim 1, wherein an arrangement position of the set of pixels of the first plurality of pixels is on a first row, an arrangement position of the set of pixels of the second plurality of pixels is on a second row, and the second row is different from the first row.

13. The imaging element according to claim 1, further comprising:

a row scanning circuit configured to drive the pixel array unit in units of rows to read a plurality of pixel signals from the plurality of pixels; and a plurality of analog-to-digital conversion units configured to perform analog-to-digital conversion of the plurality of pixel signals for each of a plurality of columns of the pixel array unit.

14. The imaging element according to claim 1, further comprising:

a pixel drive unit configured to drive the pixel array unit in units of rows to read a plurality of pixel signals from the plurality of pixels; and a plurality of analog-to-digital conversion units configured to perform analog-to-digital conversion of the plurality of pixel signals of the plurality of pixels for each of a plurality of rows of the pixel array unit, wherein the plurality of pixels is arranged in a column shape of the pixel array unit.

15. The imaging element according to claim 14, wherein an arrangement of each of the second plurality of pixels corresponds to a respective analog-to-digital conversion unit of the plurality of analog-to-digital conversion units.

16. The imaging element according to claim 1, further comprising a signal processing circuit configured to correct, based on the black level information, an output value of the each of the plurality of pixels of the pixel array unit.

17. The imaging element according to claim 16, wherein the signal processing circuit is further configured to correct the output value of the each of the plurality of pixels based on the second plurality of pixels that is in the second mode.

18. An electronic device, comprising:

the imaging element according to claim 1; and an optical system configured to supply imaging light to the imaging element.

* * * * *